United States Patent [19] [11] Patent Number: 4,682,393
Corkery [45] Date of Patent: Jul. 28, 1987

[54] SUPPORT ROLLER

[75] Inventor: Gregory O. C. Corkery, High Ridge, Mo.

[73] Assignee: Arundale, Inc., St. Louis, Mo.

[21] Appl. No.: 801,467

[22] Filed: Nov. 25, 1985

Related U.S. Application Data

[62] Division of Ser. No. 616,913, Jun. 4, 1984, Pat. No. 4,567,633.

[51] Int. Cl.⁴ ............................................. B21B 31/00
[52] U.S. Cl. ...................................... 29/130; 29/129; 301/63 PW; 34/108
[58] Field of Search ...................... 29/132, 129, 129 S, 29/130, 125, 118, 110; 301/63 PW; 34/108

[56] References Cited

U.S. PATENT DOCUMENTS

| | | | |
|---|---|---|---|
| 2,665,521 | 1/1954 | Ford | 446/465 |
| 3,452,798 | 7/1969 | Ravreby | 301/63 PW |
| 3,578,812 | 5/1971 | Taussig et al. | 301/63 PW |
| 3,849,220 | 11/1974 | Suzuki et al. | 301/63 PW |
| 3,952,786 | 4/1976 | Kreling et al. | 301/63 PW |
| 4,387,070 | 6/1983 | Cunard et al. | 301/63 PW |
| 4,444,435 | 4/1984 | Honsa | 301/63 PW |

Primary Examiner—Percy W. Echols
Attorney, Agent, or Firm—Gravely, Lieder & Woodruff

[57] ABSTRACT

A roller for supporting the rotating drum of a clothes drier or similar appliance includes a hub which is molded from a suitable polymer and a rubber tire which fits around and is interlocked with the hub. The tire is of uniform cross-sectional configuration and is stressed so that it remains in intimate contact with the hub rim, even after substantial use. To manufacture the roller, the tire, which is molded in a separate operation, is placed in a mold cavity that is configured to seal against the side walls of the tire and yet permit the tire to expand radially, maintaining the seals along the tire side walls throughout the expansion. Once the mold is closed, a polymer in a plastic state is injected into the region of the cavity surrounded by the tire, there being enough polymer forced into the mold to expand the tire radially against an outer surface of the cavity. The expansion of the tire exceeds the shrinkage that the polymer experiences upon cooling and assuming a rigid state, and as a consequence the tire remains stressed and in intimate contact with the hub.

13 Claims, 3 Drawing Figures

SUPPORT ROLLER

This application is a division, of application Ser. No. 616,913, filed June 4, 1984 now U.S. Pat. No. 4,567,633.

BACKGROUND OF THE INVENTION

This invention relates in general to rollers and more particularly to a roller for supporting a rotating drum and to a process for manufacturing such a roller.

The typical household clothes drier has a cabinet, a drum which revolves in the cabinet about a horizontal axis, and some type of arrangement for heating air and forcing that air through the drum. One end of the drum is open so that wet clothes may be placed in the drum, and of course when the drum turns, the clothes tumble in a constant stream of warm air which extracts moisture from the clothes. Since one end of the drum must be left open to place clothes in and withdraw them from the interior of the drum, the drum is not supported, at least at that end, along its axis of rotation. On the contrary, the open end of the drum rotates on small support rollers which lie beneath the drum and form a cradle for the rotating drum.

The rollers of course must be strong enough to support the weight of the drum as well as the weight of wet clothes within the drum, and they further must run smoothly along the exterior cylindrical surface of the drum without producing excessive noise. In addition, they must be durable. To this end, the conventional support roller includes a molded plastic hub, a metal sleeve bearing set into the hub, and a rubber tire around the hub. The tire of course provides the silence which is so desirable. In the manufacture of such a roller, the rubber tire is normally molded apart from the hub and then fitted snugly into die configured to produce the wheel. Then the plastic is injected into the die where it conforms not only to the die surfaces, but also to those surfaces of the tire that are presented inwardly toward the axis of rotation for the roller. As the polymer material cools it undergoes a slight contraction, and this of course tends to loosen the fit between the wheel and tire. When the roller is placed in operation, the fit loosens still further, for the rubber of the tire is stressed on a cyclical basis, or is in other words kneaded, and this tends to elongate the rubber tire. A loose tire may slip with respect to the molded plastic hub, which tends to cause even greater elongation, and furthermore a loose tire will not carry substantial lateral loads. Thus, the chances of a loose tire working off of its hub are much greater than the possibility of a tight or intimately fitted tire doing so.

Heretofore attempts have been made to retain the tire on the hub by providing positive interlocks betwee the tire and hub. For example the tire may be provided with lugs on its inwardly presented surface, and these lugs embed within the plastic of the hub when the hub is molded. However, the lugs also produce variations in the thickness in the tire, and these variations set up stress concentrations when the support roller is in operation. The stress concentrations in turn shorten the life of the tire.

SUMMARY OF THE INVENTION

One of the principal objects of the present invention is to provide a support roller having a tire that is fitted tightly around and in intimate contact with a hub and remains in that condition after the roller has experienced substantial use. Another object is to provide a support roller of the type stated in which the tire possesses a uniform cross-sectional configuration. A further object is to provide a support roller of the type stated which is simple and inexpensive to manufacture, and may be manufactured on a large scale production basis. An additional object is to provide a process for manufacturing a roller of the type stated. These and other objects and advantages will become apparent hereinafter.

DESCRIPTION OF THE DRAWINGS

In the accompanying drawings which form part of the specification and wherein like numerals and letters refer to like parts wherever they occur -

DETAILED DESCRIPTION

Figure 1:
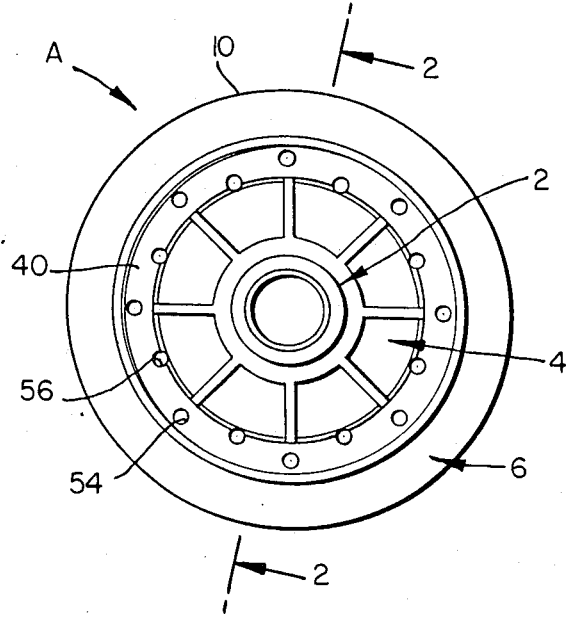
FIG. 1 is a front elevational view of a support roller constructed in accordance with and embodying the present invention.

Referring now to the drawings, a support wheel A (FIGS. 1 & 2) which rotates about an axis of rotation x has three basic components, namely a center sleeve bearing 2, a rigid polymer hub 4 surrounding the bearing 2 and an elastomeric tire 6 encircling the hub 4. The tire 6 forms the periphery of the roller A and fits tightly around the hub 4, it being in a stressed condition to insure intimate contact between the tire 6 and the hub 4. The sleeve bearing 2 fits over and revolves on a suitable journal, such as a stub axle, which may be located beneath a cylindrical surface such as the outer surface of a clothes drier drum. Indeed, the wheel A along the outwardly presented surface of its tire 6 contacts the cylindrical exterior surface of the drum, so that the downwardly directed force generated by the weight of the drum and its contents is transmitted to the journal through the tire 6, the hub 4 and sleeve bearing 2.

The sleeve bearing 2 is preferably formed from a porous metal that has been impregnated with a lubricant such as oil. It fits snugly within the hub 4 so that no slippage, either in the circumferential or axial directions, will occur between the two. The sleeve bearing 2 is long enough to project slightly beyond both end surfaces of the hub 4.

Figure 2:
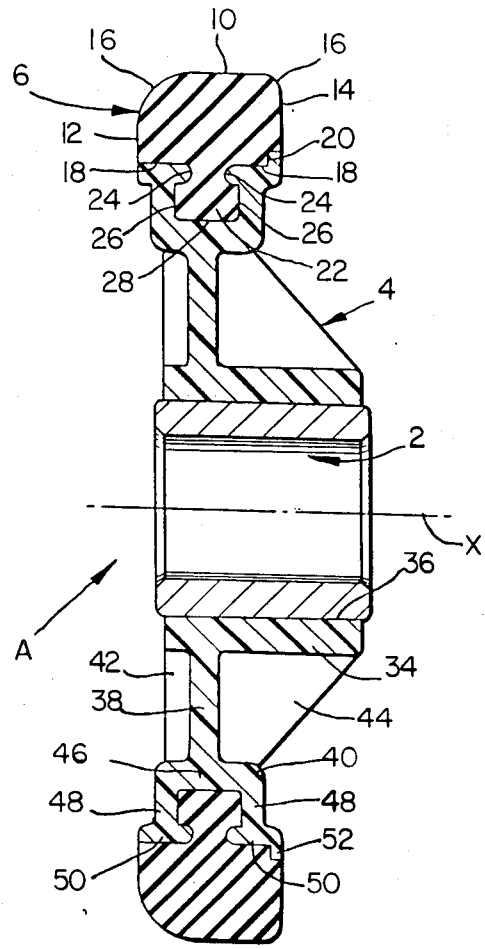
FIG. 2 is a sectional view of the support roller taken along line 2—2 of FIG. 1.

The tire 6 is molded from an elastomeric material, such as styrene butadyme rubber, and its hardness measured with a durometer should range between 65 and 75 and should preferably be about 70. It is solid throughout and has an outer or friction surface 10, which for the most part is cylindrical, and front and rear side faces or walls 12 and 14 which are flat and parallel (FIG. 2). The friction surface 10 merges into the front side wall 12 and rear side wall 14 along curved surfaces 16, with the radius of curvature for the surface 16 at the front side wall 12 being substantially greater than the radius for the surface 16 at the rear side wall 14.

The tire 6 contacts the hub 4 at a pair of annular contact surfaces 18 which extend inwardly from the side walls 12 and 14 and of course are presented inwardly toward the axis of rotation x. While the one surface 18 actually intersects the front side wall 12, the other surface is separated from the rear side wall 14 by a shallow relief 20 which is likewise of annular shape. Both contact surfaces 18 are cylindrical and continuous and are of equal diameter.

Projecting radially inwardly from the two contact surfaces 18 is an annular root 22 (FIG. 2) which interlocks with the hub 4 to secure the tire 2 on the hub 4. At the contact surfaces 18, the root 22 has two annular grooves 24, one of which opens forwardly and the other rearwardly. Inwardly from the grooves 24 the root 22 has a wider cross section, but is not nearly as wide as the main body of the tire 6, that is, the portion between the side walls 12 and 14. The root 22 has parallel side walls 26 which merge into an inner contact surface 28 which extends between the side walls 26 and is presented toward the axis x of rotation. Like the contact surfaces 18, the contact surface 28 is cylindrical and continuous, and tightly grips a matching surface on the hub 4, so that the surface 28 and the hub 4 are in intimate contact.

Turning now to the hub 4, it is preferably molded as an integral unit from a suitable polymer such as 40% talc filled polypropylene. It includes a sleeve-like center portion 34 (FIG. 2) having a center bore 36 in which the sleeve bearing 2 is received, there being an interference fit between the two so that the bearing 2 is tightly retained in the hub 4. Projecting radially outwardly from the center portion 34 is an annular web 38 which is molded integral with the center portion 34, it lying in a plane that is perpendicular to the axis x. The web 38, in turn, merges into a rim 40 which receives and interlocks with the root 22 of the tire 6. While the web 38 is offset toward the forward end of the center portion 34, the rim 40 is centered on the web 38, so that the rim 40 projects equidistantly in both axial directions from the web 38. Along its front face the web 38 is reinforced with straight ribs 42 which are not very deep, given the offset of the web 38 toward the forward end of the center portion 34. Likewise along its back face the web 38 is reinforced with more ribs 44, but these ribs resemble gussets in that they extend all the way out to the back end of the center portion 34. Each of the ribs 42 and 44 is formed integral with and merges into the web 38 as well as the center portion 34 and the rim 40.

The rim 40 is for the most part symmetrical about and underlies each of the cylindrical contact surfaces 18 and 28 of the tire 6. It includes a base 46 (FIG. 2) having a cylindrical outwardly presented friction surface against which the inner contact surface 28 on the tire 6 bears, and flanges 48 which project outwardly from base 46 along the side walls 26 of the root 22. The flanges 48, in turn, have support rings 50 along their peripheries, and these rings have outwardly presented friction surfaces which underlie the outer contact surfaces 18 for the tire 6. The rings 50 project all the way out to the side walls 12 and 14 of the tire 6 as well as inwardly into the annular grooves 24, completely filling those grooves. In addition, the rear support ring 50 has a short lip 52 at its end, and this lip projects outwardly into the shallow relief 20 along the rear side wall 14 of the tire 6.

The rim 40 in each of its flanges 48 has apertures 54 (FIG. 1) through which the side walls 26 of the root are exposed. Also along the intersection of the web 38 and the base 46 of the rim 40 additional apertures 56 extend axially entirely through the hub 4, and these apertures pass immediately inwardly from the contact surface 28 on the tire 6.

Figure 3:
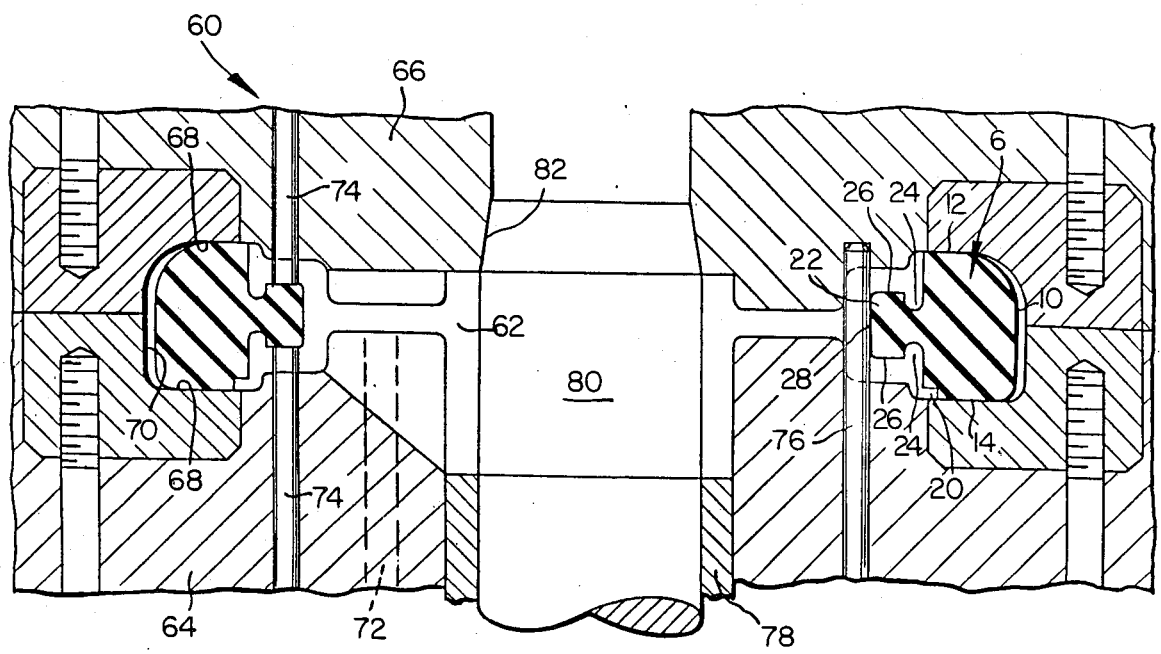
FIG. 3 is a sectional view of a mold used in the process for producing the support roller, the mold being closed and containing within its cavity the tire against which a plastic polymer is forced.

The hub 4 is produced in a mold 60 (FIG. 3) having a cavity 62, the surfaces of which match corresponding surfaces of the hub 4, except along the periphery of the hub 4 where the hub 4 takes its shape from the tire 6. The mold 60 has a lower half 64 and an upper half 66 which are capable of parting, and each half 64 and 66 contains a cavity which opens toward the cavity in the other half, the two cavities forming the cavity 62 of the mold 60. The surfaces that define the cavity for the upper half 66 correspond to the front face of the hub 4, and of course the surfaces that define the cavity for the lower half 64 correspond to the rear face. Thus, the shapes in which the gusset-like rear ribs 44 are formed are in the lower mold half 64. The mold cavity 62 corresponds precisely to the hub 4 out to the region of the rim 40 for the hub 4, but here the cavity 62 conforms generally to the configuration of the tire 6 to indeed receive the tire 6.

More specifically, in the peripheral region of the mold cavity 60, the cavity 62 has parallel side walls 68 (FIG. 3) which are spaced apart a distance generally equal to and perhaps slightly less than the spacing between the front and rear side walls 12 and 14 on the tire 6. Actually the spacing should be such that the side walls 68 of the mold cavity 62 clamp down on the tire side walls 12 and 14 with enough force to prevent flash from extruding along those side walls, yet will not prevent the tire side walls 12 and 14 from slipping or sliding outwardly relative to the mold side walls 68. In addition, the peripheral portion of the mold cavity 62 contains an outer surface 70 which connects the two side surfaces 68 and generally corresponds in shape to the friction surface 10 of the tire 6. Thus, the surface 70 is curved where it merges into the side surfaces 68, with the curvature in the upper mold half 66 being greater than the one in the lower mold half 64. While the outer surface 70 of mold cavity 62 to a measure matches the configuration of the contact surface 10 on the tire 6, it possesses a slightly greater diameter, so that when the tire 6 is in the mold 60 and is not distorted, a slight gap should exist between the tire friction surface 10 and the outer surface 70 of the mold cavity 62

Aside from the two mold halves 64 and 66, the mold 60 contains an ejector sleeve 78 which projects into the lower mold half 64 from beneath, its upper end forming the surface of the cavity 62 against which the front end face for the sleeve-like center portion 34 of the hub 4 is formed. The ejector sleeve 78, however, may move upwardly from this position to eject a molded hub 4 from the mold cavity 62, once the two mold halves 64 and 66 have separated.

Also, the mold 60 has a core 80 which extends through the ejector sleeve 78 and through the mold cavity 62, its diameter within the cavity 64 being equal to that of the center bore 36. Indeed the center bore 36 of the sleeve-like center portion 34 is formed against core 80. The core 80 fits snugly into a socket 82 in the upper mold half 66.

In order to produce the assembly consisting of the hub 4 and tire 6, the tire 6, which derives from a previous molding operation, is placed into the portion of cavity 62 in the lower mold half 64 (FIG. 3), and of course this is only achieved when the mold 60 is open. In particular, the tire 6 with its rear side wall 14 presented downwardly is fitted around the locator pins 76, which project from lower mold half 64, and is lowered into the cavity 62 of that mold half. The rear side wall 14 of the tire 6 comes to rest against the side surface 68 in the peripheral region of the mold cavity 62 for the lower mold half 64, while the rear side wall 26 of the root 22 rests on the locator pins 74. The other locator pins 76 confine the tire 6 in the radial direction and thus maintain it concentric with respect to the axis x.

Next the upper mold half 66 is lowered against the lower mold half 64, or in other words, the mold 60 is closed, and when closed the side surface 68 in the peripheral region of the cavity 62 for the upper mold half 64 comes against the front side wall 12 of the tire 6, while the ends of the locator pins 74 for the upper mold half 66 bear against the front side walls 26 of the root 22.

When the tire 6 is so positioned in the mold 60, the side surfaces 68 in the peripheral region of the cavity 62 bear face-to-face against the side walls 12 and 14 of the tire 6, and in effect clamp the tire 6 between those two surfaces 68. The clamping force, however, is not great enough to prevent the side walls 12 and 14 from sliding outwardly along the side surfaces 68, although enough contact exists to establish a seal capable of preventing flash from developing along the side walls 12 and 14. The root 22, on the other hand, is centered midway between the opposite surfaces of the mold cavity 62. The tire friction surface 10, however, is spaced from the outer surface 70 of the mold cavity 62, so that the gap exists between them.

All polymers when molded are of course in a plastic condition, and then tend to shrink as they cool and assume a solid condition. This shrinkage may range between 0.5% and 2.5%. For talc filled polypropylene the shrinkage is about 1.4%. The gap should be wide enough to permit an expansion of the tire 6 by an amount that exceeds the shrinkage for the polymer of the hub 6, and indeed the expansion should exceed the projected shrinkage by at least 0.5% and should preferably exceed it by about 1.0%. It should not, however, be so great as to cause the rubber in the tire to neck inwardly by a significant amount at any point along the tire 6.

To complete the preparation of the mold 60, the core 80 is extended into its socket 82 in the upper mold half 66 so as to block out the center of the mold cavity 62.

Once the cavity 62 is loaded with the tire 6 and the mold 60 is closed, a polymer in a plastic condition is injected into the mold cavity 62 through the gates 72. The plastic polymer fills the portion of the cavity 62 that is circumscribed by the tire 6, so that the polymer acquires its configuration from the two die halves 64 and 66 and from the root 22 of the tire 6. Thus, the tire 6 serves as a boundary for the mold casvity 62 to confine the plastic polymer. Still more polymer is forced into the cavity 62, and this additional polymer expands the tire 6, causing it to move outwardly until its friction surface 10 comes against outer surface 70 of the die cavity 62. As the tire 6 expands its side walls 12 and 14 remain against the side surfaces 68 of the mold cavity 66, preserving the seal along those surfaces so that the plastic polymer does not flash along the tire side walls 12 and 14. The locator pins 74, on the other hand, remain against the side walls 26 of the root 22 and prevent the root 22 from skewing within the cavity 62, even though the plastic polymer may not flow over it in a uniform manner. In short, the locator pins 74 keep the root 22 centered between the cavity surfaces on each side of it.

The pressure required to bring the tire 6 against the outer surface 70 of the mold cavity 62 is known, and when the polymer within the cavity 62 reaches this pressure, the gates 72 are blocked and the polymer is allowed to solidify in the mold 60, which it does, but the polymer is still warm and in an expanded condition.

Then the upper mold half 64 is separated from the lower mold half 62. Thereafter, the ejector sleeve 78 is elevated, and it lifts the hub 4 and tire 6 out of the cavity 66 in the lower mold half 62. The joined together hub 4 and tire 6 are removed from the mold 60. The apertures 54 in the hub 4 exist in areas formerly occupied by the pins 74, while the apertures 56 exist in areas formerly occupied by the pins 76. Neither weaken the hub 4.

The polymer of the hub 4 continues to cool and as it does it shrinks. The tire 6, being in a stretched condition likewise shrinks and remains tightly in contact with the hub 4. Since the tire 6 experiences a greater amount of expansion than the hub 4 does shrinkage, the tire 6 remains under tension or hoop stress after the hub 4 has reached its final size. Thus, the cylindrical contact surfaces 18 and 28 of the tire 6 remain snugly against the support rings 50 and base 46, respectively, of the rim 40 for the hub 4, so that enough friction exists between the tire 6 and the rim 4 to prevent slippage.

While the tire 6, by reason of the prestress, remains snugly against the rim 40 of the hub 4, local stress concentrations do not develop during use since the root 22 of the tire 6, and indeed the tire 6 itself, are of uniform cross-sectional configuration around the entire circumference of the tire 6. Also the cyclical loading that is experienced by the tire 6, which loading has a tendency to elongate the tire 6, does not extend to the point that the tire 6 becomes loose, since the prestress is great enough to compensate for such elongation.

This invention is intended to cover all changes and modifications of the example of the invention herein chosen for purposes of the disclosure which do not constitute departures from the spirit and scope of the invention.

What is claimed is:

1. A support roller comprising: a hub formed in a molding operation from a plastic polymer which shrinks upon cooling from a plastic condition in which it is molded to the solid condition in which it exists in the hub, the hub having a rim provided with side faces and radially outwardly presented friction surfaces that extend generally axially with respect to the axis of rotation, one of the friction surfaces for the hub rim being located between two of the other friction surfaces and being smaller in diameter than the other two friction surfaces, whereby the tire projects radially inwardly past the other two friction surfaces in the form of a root which prevents the tire from being displaced laterally off of the rim, the other two friction surfaces being generally adjacent to respective side faces of the rim; and a tire formed from an elastomeric material and circumferentially surrounding the hub at its rim, the tire having side faces which have substantial flat areas that are parallel and flush with the side faces of the hub rim where the tire surrounds the rim, so that the flat areas of the sdie faces for the tire form radially outwardly directed continuations of the side faces on the rim without surface interruption, and a plurality of radially inwardly presented contact surfaces which are against the outwardly presented friction surfaces of the hub rim, the tire being under tension in the circumferential direction and having its inwardly presented contact surfaces bearing snugly against the outwardly presented friction surfaces of the hub rim, the tension in the tire existing by virtue of the tire having served as a portion of a mold cavity in which the hub is molded and having been expanded under an outwardly directed force applied by the plastic polymer during the molding of the hub.

2. A roller according to claim 1 wherein the friction surfaces on the hub rim and the contact surfaces of the tire are substantially cylindrical.

3. A roller according to claim 1 wherein the hub rim has a lip projected radially outwardly beyond one of its friction surfaces to form the greatest diameter of the rim; and wherein one of the side faces of the rim is on the lip.

4. A roller according to claim 1 and further comprising a metal bearing located within the hub.

5. A roller according to claim 1 wherein the root has laterally opening grooves and the hub rim includes axially directed rings which project into the grooves to interlock the tire root with the hub rim.

6. A roller according to claim 1 wherein the tire is of uniform cross-sectional configuration.

7. A support roller than revolves about an axis of rotation, said roller comprising: a hub molded from a polymer which shrinks upon cooling from a plastic condition in which it is molded, the hub including an annular rim having its center at the axis of rotation, the rim having an annular base provided with a radially outwardly presented friction surface, the rim also having annular flanges which project radially outwardly from the base at each side of the friction surface for the base and have radially outwardly presented friction surfaces that are greater in diameter than the friction surface for the base, whereby a groove exists between the two flanges, the flanges having flat side faces that extend radially outwardly to the greatest diameter of the flanges; and a tire formed from an elastomeric material and circumferentially surrounding the hub at the rim, the tire having flat side faces which are perpendicular to the axis of rotation and flush with the side faces on the flanges of the hub rim where the tire surrounds the rim, so that the side faces of the tire form radially outwardly directed continuations of the side faces on the rim flanges, there being no change in the surface contour where the side faces of the tire and rim are flush, the tire between its side faces being provided with a root that projects into the groove in the rim, the tire on its root being provided with an inwardly presented contact surface that bears against the friction surface on the base of the rim, the tire on each side of its root having additional radially inwardly presented contact surfaces which bear against the friction surfaces on the flanges of the rim, the tire being under tension in the circumferential direction and having its inwardly presented contact surfaces bearing snugly against the outwardly presented friction surfaces on the rim of the hub.

8. A roller according to claim 7 wherein the friction surfaces of the hub rim and the contact surfaces of the tire are substantially cylindrical.

9. A roller according to claim 7 wherein the flanges of the hub are provided at their outer ends with support rings which project laterally toward each other over the friction surface on the base of the rim; wherein the friction surfaces of the flanges are on the support rings; and wherein the root of the tire has laterally opening grooves into which the inwardly projecting portions of the rings extend and fill.

10. A roller according to claim 9 wherein the support rings also project laterally beyond the base of the rim.

11. A roller according to claim 9 wherein the rim has a lip projecting radially outwardly from one of its support rings to form the greatest diameter of the hub; and wherein the side face on that flange is on the lip.

12. A roller according to claim 7 and further comprising a metal bearing anchored in the hub concentric to the rim.

13. A roller according to claim 7 wherein the tension in the tire exists by virtue of the tire having served as a portion of a mold cavity in which the hub is molded and having been expanded under an outwardly directed force applied by the plastic polymer during the molding of the hub.

* * * * *

UNITED STATES PATENT AND TRADEMARK OFFICE
CERTIFICATE OF CORRECTION

PATENT NO. : 4,632,393

DATED : July 28, 1987

INVENTOR(S) : Gregory O. C. Corkery

It is certified that error appears in the above-identified patent and that said Letters Patent is hereby corrected as shown below:

Column 1, line 54, "betwee" should be "between".

Column 4, line 39, there should be a period after "62".

Column 5, line 47, "casvity" should be "cavity".

Column 6, line 56, "sdie" should be "side".

Column 7, line 17, "than" should be "that".

Signed and Sealed this

Twenty-ninth Day of December, 1987

Attest:

DONALD J. QUIGG

Attesting Officer

Commissioner of Patents and Trademarks